United States Patent Office

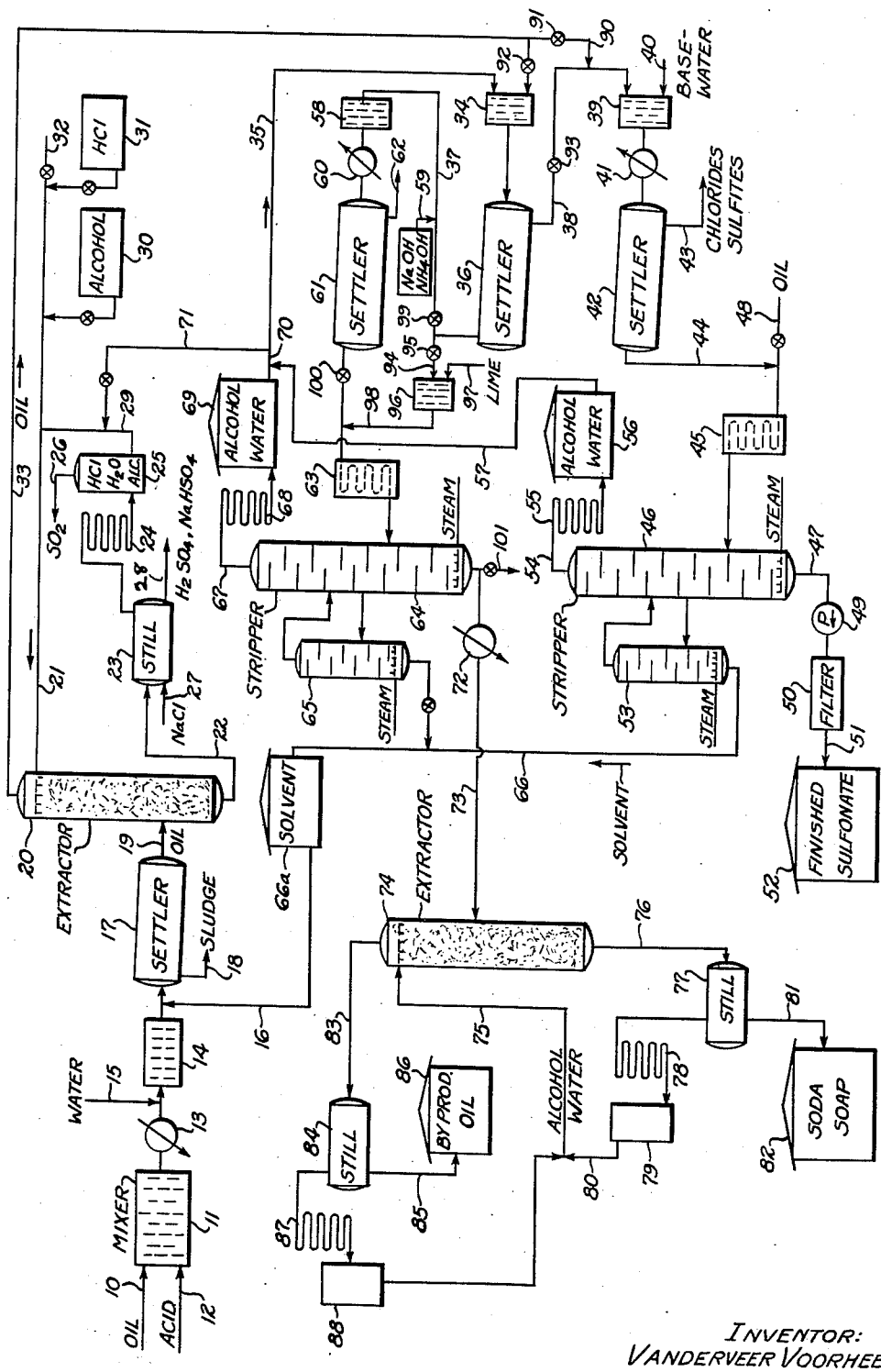

2,809,209
Patented Oct. 8, 1957

2,809,209

MANUFACTURING MAHOGANY SULFONATES

Vanderveer Voorhees, Los Altos, Calif., assignor to Bray Oil Company, Los Angeles, Calif., a limited partnership of California Application November 22, 1955, Serial No. 548,380

10 Claims. (Cl. 260—504)

This invention relates to the manufacture of sulfonates, particularly sulfonates of the preferentially oil soluble type known as mahogany sulfonates. More particularly, it relates to the manufacture of mahogany sulfonates substantially free from sulfates which have been found to interfere seriously with the corrosion preventive and emulsifying properties of the product and compositions in which it is employed.

In the sulfonation of mineral oils it is common practice to treat a lubricating oil with fuming sulfuric acid, sulfur trioxide (sulfan), chlorsulfonic acid or other sulfonating reagent. When a sludge is produced it is usual practice to separate it from the oil phase, then recover the desired sulfonic acids from the oil by neutralizing and extracting with a suitable solvent such as methanol or ethyl alcohol. The sulfonates obtained are usually contaminated with small amounts of sulfates. For example, when the sulfonated oil from treating a petroleum lubricating fraction with oleum, is neutralized with sodium hydroxide, the resulting oil, after dehydration, may contain about 15 to 18% of sodium sulfonate and about 0.2 to 1% sodium sulfate. The ash (sulfated) on this oil will be about 2-5%. Purification of the oil by extraction with solvents such as aqueous alcohol solutions, removes part of the sodium sulfate, but it is very difficult to remove all the sulfate owing to the powerful solubilizing effect of the sulfonates which hold the sulfates in solution in the oil phase.

Many methods have been tried to remove the sulfates but all have their disadvantages. Thus they have been precipitated as barium sulfate by treating with barium salts, chloride or hydroxide. However, the barium sulfate separates in a colloidal form extremely difficult to remove from the oil, owing to the peptizing action of the sulfonate present. Attempts to filter off the precipitate result in plugged filters and cloudy filtrates which fail to pass the naphtha dilution test. In this test a 5% solution of the oil in a light petroleum naphtha—approximately 200° F.–250° F. boiling point—is observed in strong light for cloud and also for sediment on standing.

One object of my invention is to produce preferentially oil soluble sulfonates free of sulfates. Another object of the invention is to produce sulfonates of various metals, ammonia or amines as desired by direct neutralization of sulfonic acid with the metal or metalloid selected—usually in the form of the oxide, hydroxide, carbonate or other salt of a weak, volatile acid, without formation of troublesome sulfates. By directly neutralizing the acid with the desired metal, no reconversion is required and no contamination of unconverted sodium sulfonate or other metal sulfonate is encountered. Still another object of the invention is to split the sulfonate into two or more fractions based on their relative solubility in oil and in water.

The invention is illustrated by a drawing, showing diagrammatically an apparatus suitable for carrying out the process.

According to my invention, sulfuric acid is extracted from sulfonated oil—so-called "acid oil"—by contacting with a solution of water, alcohol and an electrolyte. Sodium chloride can be used as the electrolyte but I prefer to use hydrochloric acid because I have found that sodium chloride metathesizes with the sulfonic acid to produce sodium sulfonate which is not desirable when making sulfonates of metals other than sodium. I have found that relatively small amounts of hydrochloric acid can be used to effect a separation between the oil-sulfonic acid phase and the alcohol phase. I have also found that hydrochloric acid has a surprising displacing action on sulfuric acid held in intimate solution or chemical combination in the oil-sulfonic acid mixture. Thus with only two or at most, three extractions, the sulfuric acid is so completely removed that the final sulfonate product gives a negative test for sulfate with barium chloride—a very sensitive test.

I prefer to employ a solvent following the sulfonation reaction, to reduce the viscosity of the sulfonated oil and aid the separation of sludge. Carbon tetrachloride can be used but I prefer to use either an aromatic hydrocarbon solvent such as benzene, toluene or xylene or a paraffinic hydrocarbon solvent such as hexane, heptane or a naphtha fraction from a paraffinic type petroleum oil. The solvent facilitates the extraction of sulfuric acid with hydrochloric acid by reducing density and viscosity.

Before adding solvent, it is usually desirable to add about 2–20% of water, based on the acid use, preferably about 5 to 15%. The water aids in sludge separation and also prevents sulfonation of the solvent in cases where an aromatic solvent is used. The sulfonated oil should be kept from overheating by supplying sufficient cooling to hold the temperature below about 120–140° F. Settling sludge at this temperature is satisfactory. Addition of cool solvent serves to hold down the temperature and remove heat generated by the addition of water.

Sludge is then allowed to settle for about 6 to 24 hours. The oil-solvent solution is then extracted with water, electrolyte and an alcohol of from 1 to 3 carbon atoms, methanol, ethyl, isopropyl or normal propyl alcohols or mixtures thereof. Chiefly for economic reasons and for effectiveness, I prefer to use isopropyl alcohol. A satisfactory solution is one which contains 4 volumes of water, 2 volumes of isopropyl alcohol and 1 volume of concentrated HCl (37%). Where sodium sulfonate is the desired product, I can substitute 2 volumes of NaCl brine (15%) for the HCl.

Extraction in a countercurrent tower is preferred and I can also use a countercurrent centrifugal extractor. I can also employ one to three batch extraction stages, preferably at least 3 stages where complete removal of sulfate is desired.

The extracted oil can be neutralized at once after removal of the sulfuric acid using NaOH, lime, Ba(OH)$_2$, LiOH, etc., for the purpose, or the sulfonic acid can be concentrated before neutralization by regulating the alcohol-water ratio, with or without additional HCl. For this purpose I have found that, when using an aromatic petrroleum solvent consisting largely of xylene in an amount substantially equal to the volume of the oil treated, most of the sulfonic acids in the treated, purified oil, separate as a heavier layer which can be removed from the oil layer, neutralized with any desired base, stripped free of solvent, dehydrated and filtered. It is usually desirable to wash chlorides from the oil after neutralizing, either before or after stripping.

Sulfur dioxide generated in the sulfonation reaction can be removed by blowing with air after sludge separation, or after extraction of sulfuric acid. Vacuum stripping can also be used to remove SO$_2$ but is not very effective unless air is passed through the oil or unless a solvent is present with a sufficiently low boiling point to boil out the SO$_2$. Benzene, hexane or carbon tetrachloride are suitable in this respect. A large part of the SO$_2$ is extracted with the alcohol-water-electrolyte wash and later eliminated from the system. Any SO₂ remaining in the oil at the neutralization stage is converted to the corresponding metal sulfite which is separated from the oil and sulfonate products by water washing or crystallization.

Water used in the process should be free of sulfates, particularly the water used in the later HCl extraction stages. Sulfate free water can be obtained by distillation or deionization with suitable ion exchange resins, etc. Likewise water used in washing the neutralized oil should be free of sulfate ions to prevent re-contamination of the product.

Referring to the drawing, a suitable aromatic type lubricating oil is charged to the process by line 10 to mixer 11 where it is contacted with fuming sulfuric acid (oleum) introduced by line 12. The oleum is suitably 25% SO₃. The oil is a distillate fraction of an aromatic type lubricating oil having a viscosity in the range of about 80 to 1000 sec. Saybolt at 100° F., preferably about 400–600. Pretreatment of the oil with sulfuric acid or extraction with a selective solvent such as furfural, phenol or liquid SO₂-benzol mixture is desirable to remove a major part of condensed ring aromatics. I can also use solvent extracts of lubricating oils from which condensed ring aromatics have been removed. Further I can use long chain alkyl benzene hydrocarbons having about 20 to 40 carbon atoms in the molecule, usually about 25 to 30.

The reaction in mixer 11 is complete in a few seconds, the heat of reaction raising the temperature of the stock twenty to thirty degrees Fahrenheit. In cases where the temperature rise exceeds this amount, it is desirable to cool the charge oil in 10 to about 60–80° F., so that the final temperature is limited to about 120 to 140° F. I can also use two or more mixers in tandem with cooling between the oleum being proportioned to the separate mixers. The amount of oleum required depends on the nature of the oil treated but usually 10% to 30% by weight is sufficient, although more highly aromatic oils can be retreated with this amount of oleum.

From mixer 11, the sulfonated oil now containing about 10 to 20% of sulfonic acid, is led through cooler 13 to mixer 14 where a small amount of quench water is mixed with the acid and oil. The water is introduced by line 15 and the rate of introduction is carefully controlled so that the ratio of water to oil is held within narrow limits—generally 1–3% of the oil by volume or about 10 to 15% of the oleum by weight.

A suitable solvent is next introduced by line 16. An aromatic naphtha boiling in the range of 270 to 290° F. is very satisfactory and it is desirable that the solvent have an initial boiling point above about 250° F. to reduce losses by evaporation and yet facilitate recovery by distillation. Paraffinic naphthas boiling in the range of heptane or octane can also be employed. In some cases a lower boiling solvent such as carbon tetrachloride or hexane can be employed, however.

After adding solvent by line 16 in an amount equal to the volume of the oil, generally in the range of ½ to 2 volumes based on the volume of oil, the mixture is settled in settler 17, preferably at a temperature of about 100 to 125° F. Settled acid and sludge are drawn off at 18 continuously or periodically while sulfonated oil in solvent solution is led by line 19 to extraction tower 20. Near the top of extractor 20, a solution of alcohol, water and electrolyte is introduced by line 21, descending through the tower in counterflow to the oil and solvent flowing upward through the tower. It is desirable to have the tower filled with packing, rings, saddles, etc. to bring about good contact between the oil and the aqueous phases. A multistage contactor of any suitable design can be substituted for the tower 20. In the contactor, sulfuric acid is completely extracted from the oil and sulfonate mixture, being partly displaced by HCl. The alcoholic solution of H₂SO₄ is conducted by line 22 to still 23 where alcohol, water and HCl are distilled off, condensed in cooler 24 and collected in receiver 25. SO₂ gas is vented by line 26 and may be recovered if desired. Sodium chloride brine can be added to the still by line 27 in an amount equivalent to the sulfuric acid, thereby converting the H₂SO₄ to NaHSO₄ which is discharged as a concentrated solution by line 28. The HCl produced in this reaction serves as make-up acid in the system.

Alcohol, water and HCl is recycled from receiver 25 by lines 29 and 21 back to tower 20. Make-up alcohol and HCl are added to the system from tanks 30 and 31, as required, while additional water is introduced by line 32, considerable water being required to hydrate the sulfonic acids and their derivatives in tower 20.

The oil, sulfonic acids and solvent stream containing HCl in solution is passed by line 33 to mixer 34 where it is mixed with additional alcohol from line 35, then introduced into settler 36 where the oil separates into two layers—an oil-solvent layer and an alcohol-sulfonic acid layer. The oil-solvent layer is generally of lower density than the alcohol-sulfonic acid layer, so that it will form on the top and can be withdrawn by line 37. The sulfonic acid-alcohol layer is withdrawn by line 38 leading to mixer 39 where it is neutralized with any desired base such as ammonia, lime, caustic soda, potash, lithium hydroxide, organic amines, morpholine, ethylene diamine, barium hydroxide, calcium carbonate, magnesia, or other desired metal or amine, usually with water. The base is introduced by line 40. The amount of base added should be sufficient to completely neutralize all the sulfonic acid. The water added with the base is desirable to speed the hydrolysis of sulfonic anhydrides and absorb soluble salts, for example, calcium chloride in the case where the base is lime. Following the mixer 39, the oil is heated by heater 41 to a convenient temperature, e. g. 125 to 175° F., to facilitate separation of a water layer in settler 42. An aqueous brine containing chlorides and sulfites is withdrawn by line 43. If a more complete removal of chloride is desired, the settler 42 can be substituted by a multistage washer, countercurrent extractor or other apparatus to effect multistage washing the neutralized sulfonates with water.

From settler 42, the alcohol solution of sulfonate is conducted by line 44 to pipe heater 45 where the stream is heated to about 300–400° F. and discharged into tower 46 where the alcohol, water and solvent is fractionated and the dehydrated sulfonate is withdrawn by line 47. If the concentration of sulfonate in oil is too high for convenient handling, additional oil such as a lubricating distillate, neutral oil or by-product oil from the process can be added by line 48. The dehydrated sulfonate passes by line 47 and pump 49 to filter 50 where excess insoluble base such as lime or baryta is removed. The finished sulfonate, usually containing from 25 to 45% sulfonate in oil, is passed by line 51 to storage 52.

The distillate in tower 46 can be separated if desired, into two fractions—a solvent fraction taken off at side stripper 53 and an overhead cut of alcohol and water taken off by vapor line 54 leading to condenser 55 and receiver 56. Excess water can be eliminated from the system by adding another side stripper, not shown, for this purpose. Alcohol and water are recycled from tank 56 by lines 57 and 35.

The oil layer in settler 36 containing most of the solvent with some alcohol and sulfonic acid passes by line 37 to mixer 58 where it is neutralized with caustic soda or ammonium hydroxide charged by line 59 as an aqueous solution.

The neutralized oil is then heated by heater 60 and settled in settler 61 where a sulfonate layer is withdrawn by line 62. The oil is then heated in pipe still 63 and stripped free of solvent in fractionator 64. The solvent is withdrawn as a side cut from side stripper 65 whence it is returned by line 66 to tank 66–a. Alcohol and water are carried overhead by line 67 to condenser 68 and receiver 69 whence it is recycled by lines 70 and 35 to mixer 34 or by lines 71 and 21 to extractor 20.

Stripped oil from the base of fractionator 64 now free of solvent, is cooled in cooler 72 to a convenient temperature, e. g. 150 to 180° F., then led by line 73 to extractor 74 where the residual sulfonate is extracted by a suitable solvent added by line 75. A solvent for this purpose may be butyl alcohol and water, for example, 20 to 70% sec. butyl alcohol in water. Other oxygenated light solvents can also be used such as methyl, ethyl or propyl alcohol, acetone, ethyl acetate and methyl ethyl ketone. The extract of residual sulfonate is withdrawn by line 76 leading to alcohol recovery still 77 where the alcohol is recovered and condensed in coil 78, collected in receiver 79 and recycled by lines 80 and 75 to tower 74. The extracted sulfonate of sodium or ammonium is withdrawn by line 81 to storage 82.

The extracted oil and solvent is withdrawn from the top of 74 by line 83 and stripped free of solvent and water in still 84, usually at a temperature of about 350 to 450° F. The stripped oil is a high grade refined lubricating oil, usually about SAE 20, 30 or 40 viscosity grade. It is withdrawn by line 85 to byproduct oil storage 86. Color and brilliance can be improved by filtering through decolorizing clay and celite. The alcohol vapors are condensed in coil 87, collected in 88 and recycled to tower 74.

When it is not required to increase the concentration of sulfonate in the oil, separator 36 can be by-passed by line 90 controlled by valve 91, valves 92 and 93 being closed. The entire oil stream from extractor 20 is then neutralized in 39 and processed as hereinbefore described.

As an alternative to the method of refining the separated oil phase from settler 36, I can extract the oil in a multistage extractor with a mixture of alcohol and water, e. g. 75–90% propyl alcohol, to remove substantially all the sulfonic acid from the oil whereupon the oil is neutralized with lime and stripped free of solvent and water, filtered and sent to storage. It may contain a very small amount of residual sulfonate which, if calcium sulfonate, may correspond to an ash of 0.01 to 0.1 percent. This sulfonate which remains in the oil acts as a valuable detergent when used for lubrication of internal combustion engines. When operating in this manner, mixer 58 and settler 61 are bypassed by line 94 controlled by valve 95 and leading to mixer 96 where the oil is mixed with lime or other base introduced by line 97. An extractor, not shown, in line 94, can be used to reduce the amount of sulfonic acid in the oil before neutralization if desired. The neutralized oil then flows to heater 63 by line 98, valves 99 and 100 being closed. The stripped oil from stripper 64 does not require further treatment beyond filtration to remove excess lime and any other insoluble matter. It can be drawn off by valved line 101 leading to a suitable filter, not shown, for clarification. Diatomaceous earth such as Celite or Filter Cel is suitable to aid clarification.

The following examples show the results obtained in purification of sulfonic acid by the process described.

*Example 1*

A lubricating oil distillate boiling in the range of about 490–587° F. at 10 mm., was partially refined by extraction with a selective solvent which removed most of the polycyclic aromatic and unsaturated hydrocarbons, leaving most of the monocyclic aromatics. The partially refined oil, having a viscosity of about 480–490 sec. at 100° F. Saybolt Universal, was sulfonated with 20 percent by weight of oleum—106% $H_2SO_4$ in two stages, holding the temperature below 125° F. by cooling between stages. To the sulfonation mixture was then added an equal volume of hydrocarbon solvent which can be hexane, heptane, benzene, toluene, xylene or a petroleum naphtha fraction boiling in the same range. In this example, an aromatic petroleum fraction boiling in the range of 260 to 290° F. was used. When an aromatic solvent is used, it is desirable to add about ½ to 1% of water by volume to the sulfonation mixture to destroy the sulfonating activity of the unreacted portion of the oleum and prevent sulfonation of the aromatic hydrocarbons in the solvent. The oil and solvent mixture is then allowed to settle to remove the acid sludge and excess sulfuric acid and the "acid-oil" is withdrawn from the upper layer.

To 1500 gm. of acid oil and solvent was added 200 ml. of isopropyl alcohol, 400 ml. of water and 50 ml. of conc. HCl (ca. 37%). The mix was agitated thoroughly, then settled for ten minutes. A sharp separation of a clear, aqueous phase (485 ml.) took place, which was separated and tested for sulfuric acid with $BaCl_2$. A heavy white precipitate in acid solution showed the presence of sulfate ion. Much $SO_2$ was apparent from the odor, showing the presence of sulfurous acid.

The above extraction was repeated, producing 590 ml. of aqueous layer after only six minutes settling. The sulfate ion was still detectable. The water extracts were combined and analyzed for $SO_4^{--}$ ion. Approximately 2 gm. $BaSO_4$ equivalent was obtained. The oil was swept with air in vacuum to remove part of the remaining $SO_2$ which stubbornly persists in solution in the oil.

The sulfonate was then concentrated by adding 200 ml. each of isopropyl alcohol and water and thoroughly agitating. After settling 20 minutes, a lower sulfonic acid layer, 66 gm., was removed. The upper layer consisting mostly of unsulfonated oil and solvent was extracted with 100 ml. each of isopropyl alcohol and water and settled. The lower, aqueous layer—310 gm.—was combined with the previous extract and 30 gm. lime was added to neutralize the acids. It was immediately dehydrated by heating to 325° F., water, alcohol and hydrocarbon solvent being driven off. The resulting calcium sulfonate was so highly concentrated it could not be handled easily so 50 gm. of medium grade lubricating oil was added as a flux. The product was filtered slowly, using "Hyflo" Celite. It was quite fluid and clear. The alkali value was 22.1 mg. KOH equivalent per gm. ash (sulfated)—9.91%.

The oil-solvent layer containing most of the hydrocarbon solvent was neutralized with lime (15 gm.) and stripped free of solvent at 400° F. by steam distillation. It was filtered hot with 10 gm. of lime and some decolorizing clay (Filtrol). The oil was opalescent.

Color, ASTM_____ 4½
Ash, sulfated_____ 0.565

The high ash value shows that part of the sulfonic acid remained in the oil-solvent layer after two extractions.

*Example 2*

To 1500 gm. sulfonated oil-solvent mixture was added 200 ml. isopropyl alcohol, 400 ml. water and 50 ml. conc. HCl. After thorough mixing and settling, 500 ml. water layer was drawn off. Two more extractions of the oil were made with the following mixture: 150 ml. isopropyl alcohol; 450 ml. water and 50 ml. HCl. After each extraction there was obtained 600 ml. water layer, the last testing substantially negative for sulfate ion showing nearly complete removal of sulfuric acid in the first two stages of extraction.

The washed oil-solvent-sulfonic acid layer was concentrated by mixing with 200 ml. isopropyl alcohol and 100 ml. water. After settling at ambient temperature, the lower layer containing most of the sulfonic acids was drawn off and weighed 608 gm. Lime (20 gm.) was immediately added to neutralize the sulfonic acids and produce calcium sulfonate.

The upper layer containing most of the solvent and the oil was further extracted with a mixture of 150 ml. of isopropyl alcohol and 50 ml. water producing 255 gm. aqueous extract. Another extraction with 150 ml. water and 100 ml. isopropyl alcohol gave 300 ml. of a milky extract. When combined, neutralized with lime and evaporated to remove all water, alcohol and solvent, only 7.3 gm. of calcium sulfonate was obtained from the extract, indicating that the sulfonic acids remaining in the oil are highly oil-soluble and difficult to remove from the oil in the presence of hydrocarbon solvent. Further extractions with alcohol-water mixture removed progressively smaller amounts of these highly oil soluble sulfonic acids. After neutralizing with lime, the oil was stripped free of solvent and dehydrated at 350° F., then filtered. The product oil had a color, ASTM, of 5 and ash (sulfated) of 0.0168%.

The calcium sulfonate from the lower layer above was dehydrated at 380° F. in the presence of excess lime. It filtered rapidly to a yield of 350 gm. and tested as follows:

| | |
|---|---|
| Alkali value [1] | 14.5 |
| Ash (sulfated) percent | 5.85 |
| Calcium sulfate in ash do | 100 |

[1] The alkali value is the milligrams of KOH per gram of oil equivalent to its neutralizing effect when titrated with HCl and phenolphthalein indicator.

*Example 3*

To 1500 gm. acid oil as in the foregoing example was added 200 ml. isopropyl alcohol, 400 ml. water and 50 ml. HCl. After thorough mixing and settling, the water layer containing extracted sulfuric acid was removed and the extraction was repeated with 100 ml. alcohol, 400 ml. water and 50 ml. HCl.

The oil-solvent layer was then concentrated by adding 200 ml. alcohol and 100 ml. water. After settling at about 80° F., for 1 hour, the lower layer was drawn off, and weighed 520 gm. Acid value—22. Ethylene diamine was added to neutralize—8 gm. being added. A water layer of 69 gm. was separated and tested sulfate and chloride free. The amine sulfonate was dehydrated to 300° F., 50 gm. oil being added to reduce viscosity for filtration. The yield was 190 gm. of a clear red viscous oil, solid when cold.

Titration with phenolphthalein indicator gave an acid value of 23, while with methyl orange, the alkali value was 18. Ash—0.092%. It was tested for corrosion resistance in a solution with distillate lubricating oil, using 7% of the sulfonate-oil product. A steel panel dipped in this compound and suspended in the humidity cabinet failed to show any sign of rust for 18 days.

The upper oil-solvent layer was neutralized with NaOH, washed with water, settled at 140° F., and separated. The water layer—250 gm.—was evaporated and yielded 51 gm. of a sodium sulfonate-oil solution. The extracted oil was stripped of hydrocarbon solvent at 380° F. in a stream of steam. An oil yield of 577 gm. was obtained. Color—ASTM—6. Ash—0.385%.

*Example 4*

In this example, the amount of HCl was reduced, thereby simplifying the HCl recovery problem. To 1500 gm. of acid oil containing about 50% of a xylene substitute solvent was added 200 ml. isopropyl alcohol, 400 ml. water and 10 ml. HCl. After mixing and settling 25 minutes, a sharp separation into two layers resulted. The clear, yellow water layer—400 ml.—was drawn off and found to contain $H_2SO_4$ equivalent to 5 gm. $CaSO_4$. The oil was again extracted with 400 ml. water, 100 ml. alcohol and 10 ml. HCl, giving an extract layer of 465 ml. containing $H_2SO_4$ equivalent to 3 gm. $CaSO_4$.

The purified oil from which sulfuric acid had been extracted was then mixed with 100 ml. alcohol and 50 ml. water. After settling 20 minutes at the ambient temperature, 70–90° F., a sulfonic acid layer of 640 ml. was withdrawn, neutralized with 30 gm. lime, and dehydrated to 380° F. The oil-sulfonate filtered rapidly and clear. Yield—360 gms.

Alkali value—2.0. Ash—5.15%

When tested for sulfate by ether—HCl extraction and precipitation with $BaCl_2$, no sulfate was detected, showing how completely the HCl-alcohol treatment removed the sulfuric acid from the acid oil.

*Example 5*

In order to determine the amount of alcohol required for washing sulfuric acid from the sulfonated oil and solvent, another lot of acid oil, 1500 gm., was extracted with 50 ml. HCl (conc.) and 100 ml. $H_2O$. After standing two hours, 88 ml. of a clear water layer was separated. It gave a strong qualitative test for sulfate. Another extraction with 100 ml. $H_2O$ + 75 ml. HCl (conc.) gave an emulsion which failed to separate. However, the addition of only 40 ml. isopropyl alcohol and 100 ml. water resulted in the separation of 315 ml. aqueous layer which gave a positive test for $SO_4^{--}$. A third extraction was made with 200 ml. water, 20 ml. isopropyl alcohol and 20 ml. HCl. After 2 hours settling, an extract of 190 ml. was separated, testing faintly for $SO_4^{--}$. This extraction was again repeated to give an extract of 230 ml. aqueous alcohol layer testing negative for $SO_4^{--}$.

To the oil was then added 200 ml. methanol and 50 ml. water, mixed and settled 90 minutes. A bottom layer containing most of the sulfonic acid separated sharply and measured 780 ml., leaving most of the unsulfonated oil in the upper layer (see below). The sulfonic acid layer was boiled with excess lime in 200 ml. water, then separated in the oven at 140° F. A lower aqueous layer (300 ml.) was drawn off and the oil was dehydrated at 300° F. Yield 210 gms. When filtered hot with Hyflo cel, the following test results were obtained:

| | |
|---|---|
| Alkali value | 11.0 |
| Ash (sulfated), percent | 7.61 |
| $CaSO_4$—percent of ash | 99.6 |
| Chlorine as NaCl | .00878 |
| Dilution in naphtha, 5% | clear |

The unsulfonated oil layer was neutralized with NaOH solution, and extracted with equal volumes of water and aqueous sec. butyl alcohol (70%). The oil was then stripped free of solvent at 350° F. and weighed 502 grams. Ash—0.103%. The stripped oil was then twice extracted with a mixture of equal volumes of water and aqueous sec. butyl alcohol, yielding about 5 gm. extract of sodium sulfonate. The oil was then dried and filtered hot with Filtrol clay. The color was light and the ash—.003%—showed almost complete removal of the sulfonate.

A corrosion test (MIL–L–644A) was made with the sodium sulfonate (5 gm.) recovered from the oil. A sand blasted steel test strip was dipped in an oil solution of the sulfonate having a concentration corresponding to 0.811% ash (sulfated). The strip was hung in the humidity cabinet and observed daily for 13 days before rust spots appeared, indicating good protection against rust by this highly oil soluble type of sodium sulfonate.

In carrying out my process of removing sulfuric acid from acid oil by extraction, I employ a solvent in which water is the predominant constituent with sufficient alcohol and hydrochloric acid to effect separation and prevent emulsification. For 100 parts of water by volume I use about 10 to 50 parts of alcohol and from 2 to 25 parts of concentrated HCl, preferably about 4 to 10 parts HCl by volume. In multiple stage extraction, the amount of HCl can be reduced in the later stages owing to the retention of HCl in the oil-sulfonic acid phase.

In the oil rejection or concentration step of my process, I employ a ratio of alcohol: water in the range of 1:1 up to 8:1, generally about 2:1 when using isopropyl alcohol. With methanol, less water is required than with propyl alcohol to effect separation of sulfonic acid from the oil-solvent mixture.

Acid resistant equipment is required where it comes in contact with the sulfonic acids inasmuch as they are highly corrosive. For this purpose I can employ glass-lined steel or plastic coated steel. The epoxy resins are satisfactory for tank and tower linings, particularly when reinforced with glass fiber. Conduits of polyethylene, polyvinyl chloride, phenol-formaldehyde, and similar acid resistant resins can be used. Hydrochloric acid is recovered and stored in equipment well known to the art using glass enameled steel, tantalum heaters, Hastelloy, Monel, etc.

The versatility of my process of making sulfonates can be readily appreciated when it is considered that it is only necessary to neutralize the sulfonic acid with a different base metal or amine to give a different product, no change in purification operations being required. Bases can be oxides, hydroxides, or carbonates of a wide variety of metals such as calcium, barium, lithium, magnesium, aluminum, lead, copper, cadmium, zinc, etc.

Having thus described my invention, what I claim is:

1. The process of making purified mahogany sulfonates substantially free of sulfates which comprises forming a solution of crude mahogany sulfonic acid contaminated with sulfuric acid, in a volatile solvent selected from the class consisting of hydrocarbons and chlorinated derivatives thereof, mixing the said solution with a solution of water, an alcohol of 1 to 3 carbon atoms and hydrochloric acid, separating the mixture into two phases, an oil-sulfonic acid-solvent phase and an aqueous phase containing sulfuric acid and water soluble impurities, neutralizing the oil-sulfonic acid-solvent phase with a base, forming a desired sulfonate of said base, then distilling water and solvent from said sulfonate.

2. The process of claim 1 wherein said neutralized sulfonate is washed with a mixture of water and alcohol to remove water soluble chlorides before distilling off said solvents.

3. The process of making a mahogany sulfonate substantially free of sulfates which adversely affect the corrosion preventive properties of said sulfonate, which comprises sulfonating a petroleum hydrocarbon lubricating oil by contacting with oleum under controlled conditions of temperature and time to effect substantial formation of sulfonic acid, diluting the sulfonation mixture with a volatile solvent selected from the class consisting of hydrocarbons and chlorinated derivatives thereof, settling and separating sludge from the diluted mixture, withdrawing the upper layer of acid oil to an extraction zone and contacting it therein with a solution of water, an alcohol of 1 to 3 carbon atoms and HCl, the amount of alcohol and HCl being sufficient to separate an aqueous phase from the oil and sulfonic acid, withdrawing said aqueous phase containing contaminating sulfuric acid, neutralizing the sulfonic acid with a desired base, distilling solvent from the neutralized oil and dehydrating the product.

4. The process of claim 3 wherein hydrocarbon solvent and alcohol are separately recovered and recycled in the process.

5. The process of claim 3 wherein the sulfonic acid is concentrated after the HCl extraction step by forming a mixture with alcohol and water in which the alcohol is in predominating amount, separating into two phases, an oil phase and a sulfonic acid phase, and recovering sulfonate from the sulfonate phase.

6. The process of extracting sulfuric acid from preferentially oil soluble petroleum sulfonic acid in solution in petroleum lubricating oil which comprises diluting said oil with a volatile solvent selected from the class consisting of hydrocarbons and chlorinated derivatives thereof, extracting the resulting solution at least twice with an aqueous solution of hydrochloric acid and an alcohol of 1 to 3 carbon atoms and thereafter neutralizing the sulfonic acid-oil-solvent solution with a base and distilling off the said solvent.

7. The process of claim 6 wherein the said base is a polyvalent metal compound selected from the class consisting of oxides, hydroxides and carbonates.

8. The process of claim 6 wherein the said base is an amine.

9. The process of claim 6 wherein said alcoholic solution comprises water, isopropyl alcohol and hydrochloric acid in the proportion of at least two volumes of water to one volume of alcohol and less than ½ volume of hydrochloric acid to one volume of alcohol.

10. The process of claim 6 wherein said sulfonic acid-oil solution is diluted with about ½ volume to 2 volumes of said solvent before extracting with hydrochloric acid.

References Cited in the file of this patent

UNITED STATES PATENTS

| | | |
|---|---|---|
| 2,509,863 | Harlan | May 30, 1950 |
| 2,530,757 | Bransky et al. | Nov. 21, 1950 |